United States Patent [19]

Tagashira et al.

[11] Patent Number: 5,660,655
[45] Date of Patent: *Aug. 26, 1997

[54] TIRE AND RIM COMBINATION WITH EXHAUST RIBS IN TIRE BEAD

[75] Inventors: Kenji Tagashira; Yoshiaki Uemura, both of Kobe; Masanao Yoshida, Akashi, all of Japan

[73] Assignee: Sumitomo Rubber Industries, Ltd., Hyogo-ken, Japan

[*] Notice: The term of this patent shall not extend beyond the expiration date of Pat. No. 5,318,089.

[21] Appl. No.: 508,239

[22] Filed: Jul. 27, 1995

Related U.S. Application Data

[63] Continuation of Ser. No. 171,438, Dec. 22, 1993, abandoned, which is a continuation-in-part of Ser. No. 923,621, Aug. 3, 1992, Pat. No. 5,318,089.

[30] Foreign Application Priority Data

Aug. 9, 1991 [JP] Japan ............................ 3-224730
Jun. 16, 1992 [JP] Japan ............................ 4-183250

[51] Int. Cl.$^6$ ............................ B60C 15/02; B60C 15/024
[52] U.S. Cl. ............................ 152/544; 152/539; 152/543; 152/DIG. 9
[58] Field of Search ............................ 152/539, 543, 152/544, DIG. 9

[56] References Cited

U.S. PATENT DOCUMENTS 1,915,963 6/1933 Wait .
4,353,403 10/1982 Ruip .
5,318,089 6/1994 Tagashira et al. ............................ 152/544

FOREIGN PATENT DOCUMENTS

| 522447 | 9/1953 | Belgium . |
| 2409163 | 6/1979 | France . |
| 2536017 | 5/1984 | France . |
| 58-057321 | 4/1983 | Japan . |
| 295878 | 1/1954 | Switzerland . |
| 2011324 | 7/1979 | United Kingdom . |
| 2026957 | 2/1980 | United Kingdom . |

Primary Examiner—Adrienne C. Johnstone
Attorney, Agent, or Firm—Birch, Stewart, Kolasch & Birch, LLP

[57] ABSTRACT

A tire and rim combination including a flanged rim and a pneumatic tire. The tire includes a pair of bead parts each provided with a plurality of, preferably at least 8, pieces of exhaust ribs projecting from a bead outside surface and extending outwardly in a radial direction so as to form air passages for escape of air between a rim flange and the bead outside surface during rim assembly. A distance F1 from an inner end of the exhaust rib to a bead base line is in a range of 0.7 to 1.5 times a flange height FH measured from the bead base line, and a distance F2 from an outer end of the exhaust rib to the bead base line is not less than 1.1 times the flange height FH. The exhaust rib has a triangular sectional shape having a width of 0.5 to 1.0 mm and a height of 0.5 to 2.0 mm.

7 Claims, 7 Drawing Sheets

5,660,655

TIRE AND RIM COMBINATION WITH EXHAUST RIBS IN TIRE BEAD

This application is a continuation of application Ser. No. 08/171,438 filed on Dec. 22, 1993, now abandoned, which is a Continuation-in-part of application Ser. No. 07/923,621 filed Aug. 3, 1992, now U.S. Pat. No. 5,318,089.

The invention relates to a tire and rim combination capable of maintaining stable ride when using the tire by inhibiting formation of gaps between an outer surface of a bead part and a rim flange so as to prevent rim deviation, without leaking high pressure air injected in a tire.

BACKGROUND OF THE INVENTION

In a pneumatic tire, for example, in a tire used for a passenger car, as the vehicle speed becomes higher, the frequency of abrupt starting and abrupt stopping becomes high. As a result, a strong fitting force between bead parts and the rim is required. On the other hand, the use of tubeless tires is increasing for high speed running, and in such tubeless tires, it is mounted on a rim with a particularly strong fitting force. In a tire for a bus or a truck exposed to a heavy load, as the load increases, it comes to be fitted to the rim with a stronger fitting force.

When assembling such a tire to the rim (c), as shown in FIG. 9, the bead bottom surface (b) of the bead part (a) is firmly fitted to the rim seat part (d) without causing a gap. But the bead outside surface (f) guided by the rim flange (e) starts contacting the upper end of the flange (e) when being assembled into the rim (c), so that a gap (g) is formed between the lower side of the outer side surface (f) and the flange (e).

This gap (g) decreases gradually as the tire runs to be fitted with the outer side surface (f). But along with the decrease of the gap (g), the rim assembly precision varies, and the fitting state of the tire and rim is changed. That is, the balance of the rim assembly state and the distribution state of the force variation are changed. This can lead to imbalance or impairment of force variation. Furthermore, the contact area of the bead part and rim decreases, and a rim deviation occurs between the bead part and rim seat when sudden braking occurs, which disturbs the straightforward motion and lowers the durability of the tire.

In the tire assembled in the rim, meanwhile, although the force variation is checked before shipping, there is a difference in the assembly precision between the rim assembled in the shop and the rim assembled by the user. Therefore, in order to prevent formation of force variation, there has been a keen demand for the development of a tire with such gap even if the tire is assembled in the rim without any particular attention by the user.

As a result of repeated studies and experiments to satisfy the above demand, the present inventors reached the following conclusions.

Formation of a gap between the bead outside surface and rim flange may be inhibited at the time of rim assembling by:
(1) Installing exhaust means capable of communicating between the gap and outside when assembling in the rim;
(2) Installing this exhaust means by providing grooves or ribs on the bead outside surface; and
(3) Setting the inner end of the exhaust means at a position remote from the bead bottom surface in a specific distance in the radial direction. Further, it is found that ribs as the exhaust means are superior to grooves in stability of rim assembly after inflating the internal pressure.

Incidentally, formation of ribs or grooves on the bead outside surface had been shown in the U.S. Pat. No. 4,353,403, but this proposal is intended to prevent swelling of the tire when the tubeless tire is mounted on a wheel having a rim diameter smaller than the design value. In the above proposal, in order to achieve this object, the inner end of the grooves or ribs is extended nearly up to the bead bottom surface. When the composition of this proposal is applied to eliminate the gap caused when assembling on the rim, even the air accumulated in the tire inner space may be forced out.

SUMMARY OF THE INVENTION

It is hence a primary object of the invention to present a tire and rim combination capable of maintaining running stability by inhibiting formation of a gap between the bead outside surface and the rim flange so as to prevent rim deviation, without allowing escape of the high pressure air accumulated in the tire inner space when assembling the tire into the rim.

According to one aspect of the present invention, a tire and rim combination comprising;
 a rim, said rim including a rim seat and a rim flange extending outwardly in a radial direction from the rim seat, the rim seat extending to a rim protrusion on an axially inner side thereof; and
 a pneumatic tire comprising a pair of bead parts each having a bead bottom surface seating on the rim seat and a bead outside surface connecting with the bead bottom surface and abutting against the rim flange, said bead outside surface being provided with a plurality of, preferably at least 8, pieces of exhaust ribs each projecting from the bead outside surface and extending outwardly in a radial direction from an inner end of the exhaust rib so as to form air passages for escape of air between the rim flange and the bead outside surface during rim assembly, wherein
 a distance F1 from the inner end of the exhaust rib to a bead base line in the radial direction is in a range of 0.7 to 1.5 times a flange height FH measured in the radial direction from the bead base line to a radially outer edge of the rim flange,
 a distance F2 from an outer end of the exhaust rib to the bead base line in the radial direction is not less than 1.1 times the flange height FH,
 said exhaust rib has a triangular sectional shape having a width in a tire circumferential direction of 0.5 to 1.0 mm and a height in the tire axial direction of 0.5 to 2.0 mm, and
 a bead inside surface opposite to the bead outside surface and adjacent the bead bottom surface for each of the bead parts, the bead inside surface and the bead bottom surface being spaced from and out of engagement with the rim protrusion.

Here, the bead base line refers to the reference of the nominal diameter NRD of the rim, and means the tire axial line passing through a bead heel point at which the rim seat intersects the rim flange.

In rim assembling, the bead bottom surface and rim seat are adhered with a strong fitting force. Accordingly, when starting the rim assembly, as shown in FIG. 5, the bead outside surface is inclined to the rim flange. Therefore, even if the inner end of the exhaust rib is remote form the bead base line by a distance F1 of 0.7 to 1.5 times the flange height FH, the air existing in a gap between the bead outside surface and the rim flange is exhausted through the air passages formed by the exhaust ribs during rim assembling. As a result, the residual air in the gap after completion of proper assembling is remarkably reduced.

Therefore, the nonuniformity of the rim assembly precision in the circumferential direction likely to occur conventionally as the gap changes with the passing of the time in tire running will decrease. Force variation due to tire RRO and imbalance due to lowering of rim assembly precision will not increase. As a result, even in the case of long-term running, vibrations do not increase, and the running stability and comfort of riding are maintained. Also uniform fitting and contact of the tire bead part and rim are retained, and therefore rim deviation in sudden braking is prevented while durability is enhanced. In addition, it is not necessary to pay special attention to rim assembling procedure, and the working efficiency is not lowered.

If the distance F1 of the inner end of the exhaust rib is less than 0.7 times the flange height FH, it is feared that a high internal pressure air would leak because of lateral force on the tire such as during cornering. On the other hand, if the distance F1 is over 1.5 times the flange height FH, even at the start of rim assembly, the inner end of the exhaust rib does not communicate with the gap, and the residual air in the gap may not be forced out.

Also, because the exhaust rib has a triangular sectional shape, the exhaust rib is easily deformed so as to fit the rib to the rim flange when the tire is inflated, thereby increasing the seal effect for the internal pressure of tire as well as the stability and the precision of rim assemble.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described by way of example, referring the attached drawings which are given by way of illustration only, and thus are not limitative of the present invention, and, in which.

DETAILED DESCRIPTION OF THE INVENTION

Figure 1:
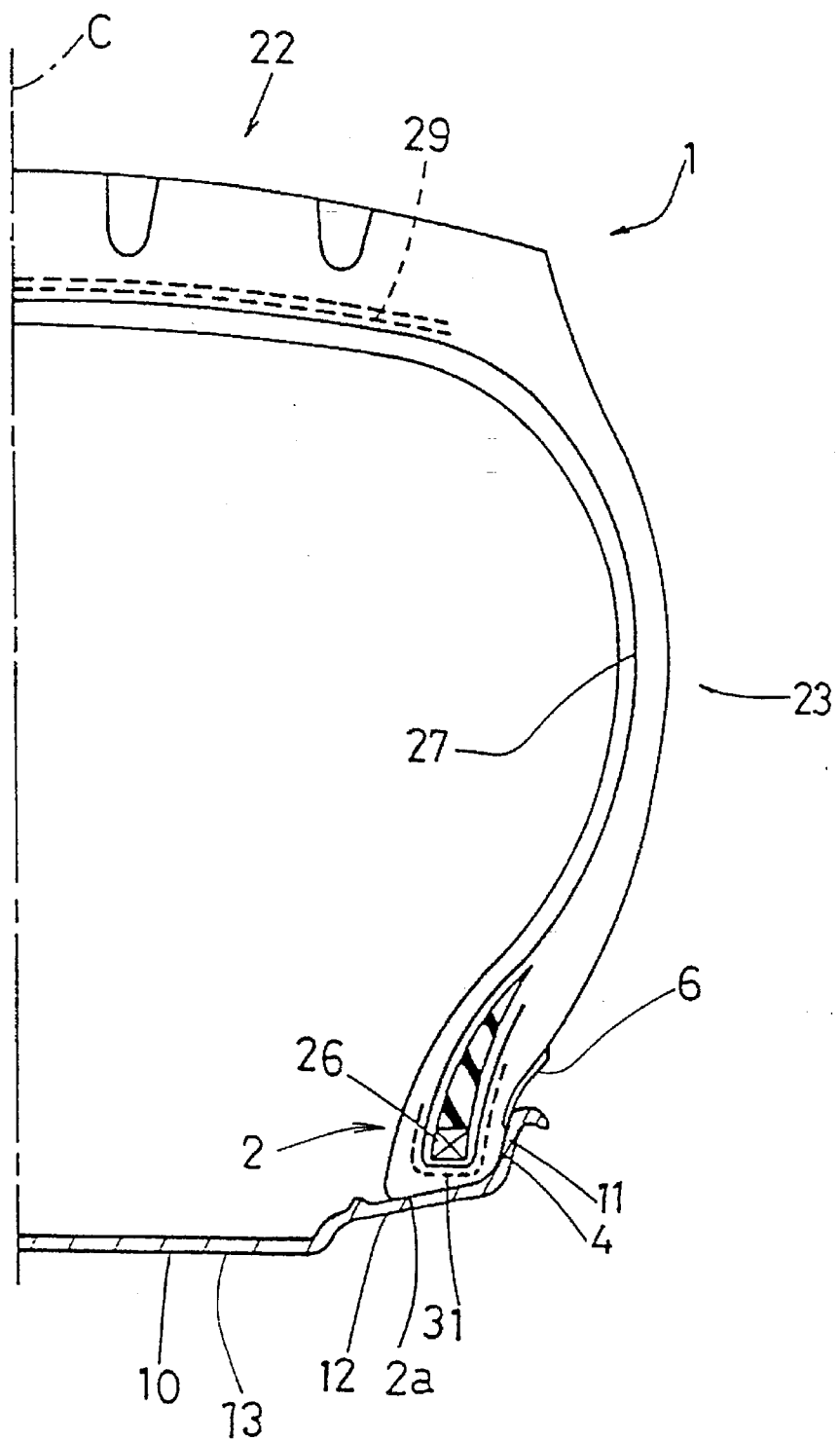
FIG. 1 is a sectional view of a right half of a tire showing an embodiment of the invention.

FIGS. 1 to 5 show a tire and rim combination.

In the embodiment, a pneumatic tire 1 is formed as a tubeless tire, and a plurality of exhaust ribs 6 extending in the tire radial direction are disposed on a bead outside surface 4 confronting a rim flange 11.

A rim 10 has a pair of rim flanges 11 each receiving a bead outside surface 4 of a tire 1, a pair of rim seats 12 each extending inwardly from the rim flange 11 and receiving the bead bottom surface 2a of a tire 1, and a well region 13 between the rim seats 12. The rim flange 11 and rim seat 12 are smoothly connected to each other through a curvature heel region. Therefore, a bead heel point is defined as a intersection of a extension line of the rim flange 11 and extension line of the rim seat 12. Also a bead base line 7 is defined as a tire axial line passing through the bead heel point for the nominal diameter NRD of the rim.

The pneumatic tire 1 comprises a tread part 22, side wall parts 23, 23 each extending radially inwardly from both ends of the tread part 22, and bead parts 2, 2 each positioned in a radially inside end of the side wall part 23. Also, the pneumatic tire has a toroidal carcass 27 extending from the tread part 22 through sidewall parts 23 and turned up around a bead core 26 of each of two bead parts 2. A belt layer 29 is disposed radially outside the carcass 27.

The carcass 27 has a so-called radial or semiradial structure in which carcass cords are inclined at an angle of 60 to 90 degrees, in the embodiment, with respect to the tire equator C. The carcass cords are made of fiber cords such as nylon, polyester, rayon and aromatic polyamide.

The belt layer 29 is composed of at least two belt plies of belt cords crossing each other between the adjacent belt plies. The belt cords can be made of the same material as the carcass 27 such as, fiber cords like nylon, polyester, rayon and aromatic polyamide, or steel cords.

In the embodiment, a reinforcing layer 31 enveloping the carcass 27 around the bead core 26 is provided at the bead part 2. The reinforcing layer 31 is composed of a ply having organic fiber cords of enough strength such as aromatic polyamide cords or steel cords arranged so as to cross the carcass cords. The rigidity of the bead part 2 is enhanced by this reinforcing layer 31.

In the bead part 2, moreover, a chafer 32 capable of forming the bead bottom surface 2a and bead outside surface 4 is disposed outside the reinforcing layer 31. The hardness of the rubber of the chafer 32 in the embodiment is higher than that of the other rubber of the tire bead part 2, and the hardness is set to be larger than 65 degrees of JIS A hardness. A bead inside surface 4a is opposed to the bead outside surface 4 and adjacent the bead bottom surface 2a. Rim seat 12 extends to rim protrusion 52. The tire between the bead inside surface 4a and the bead bottom surface 2a is spaced from and out of engagement with the rim protrusion 52 as seen, for example, in FIG. 2.

When the pneumatic tire 1 is assembled correctly in the rim 10, the bead bottom surface 2a is seated on the rim seat 12, and the bead outside surface 4 abuts against the rim flange 11.

Figure 2:
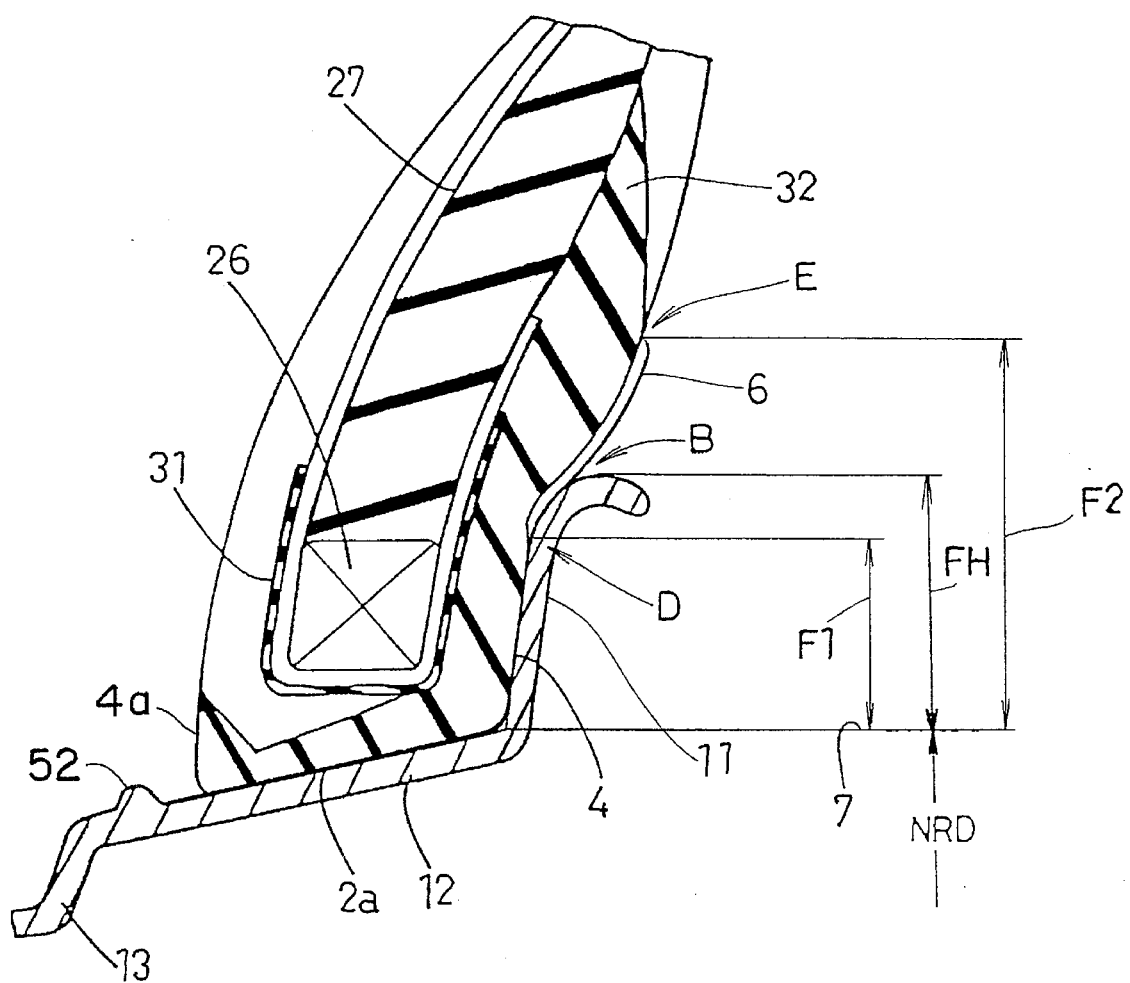
FIG. 2 is a sectional view magnifying a bead part.

The rim flange 11, as shown in FIG. 2, has a upper end portion which is curved outside in the axial direction so as to go apart gradually from the bead outside surface 4. Herein, a separating point B is defined as a point at which the bead outside surface 4 separates from the rim flange 11 when the tire 1 is correctly mounted on the rim 10. The rim flange height FH is defined as a distance measured in the radial direction from the bead base line 7 to a radially outer edge of the rim flange 11.

A plurality of exhaust ribs 6, preferably at least eight exhaust ribs 6 are provided on the bead outside surface 4 at equal intervals in the tire circumferential direction. Each of the exhaust rib 6 extends outwardly in the radial direction from an inner end D remote from the bead base line 7 by a distance F1 of 0.7 to 1.5 times the flange height FH. A distance F2 from an outer end E of the exhaust rib 6 to the bead base line 7 in the radial direction is not less than 1.1 times the flange height FH, and a length of the exhaust rib 7 along the rib is preferably in a range of 5 to 15 mm.

Figure 3:
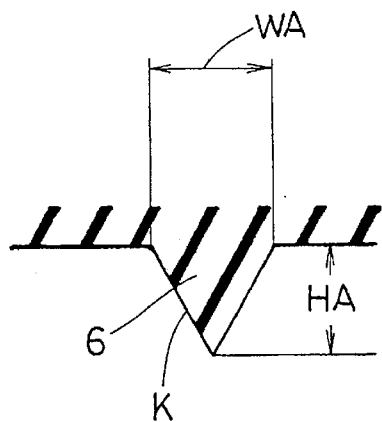
FIG. 3 is a sectional view magnifying a exhaust rib.
Figure 4:
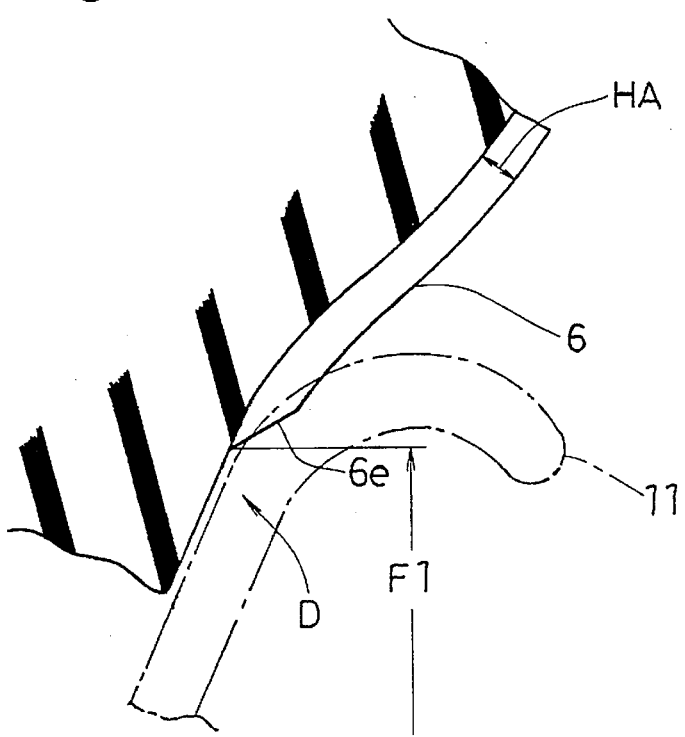
FIG. 4 is a sectional view showing an inner end of the exhaust rib.

The exhaust rib 6 has a triangular sectional shape K having a width WA in a tire circumferential direction of 0.5 to 1.0 mm and a height HA in the tire axial direction of 0.5 to 2.0 mm, as shown in FIG. 3. This shape K may be formed by an obtuse-angle triangle but preferably an acute-angle triangle.

The inner end D of the exhaust rib 6 is provided with an inclination part 6e which reduces the height HA smoothly toward inside in the radial direction, thereby forming an air-tight contact that the bead outer surface 4 contacts air-tightly with the rim flange 11 from a bead heal to a vicinity of the inner end D of the exhaust rib 6. Further, the bead part 2 is inserted into the rim 10 smoothly by the inclination part 6e, thereby improving the work efficiency. The inclination part 6e, also, has a triangular sectional shape similar to the shape K, in the embodiment. The inclination part may be formed by an inclining plain surface.

The action of forcing the air from the gap (g) between the bead part 2 and rim flange 11 will now be described.

Figure 5:
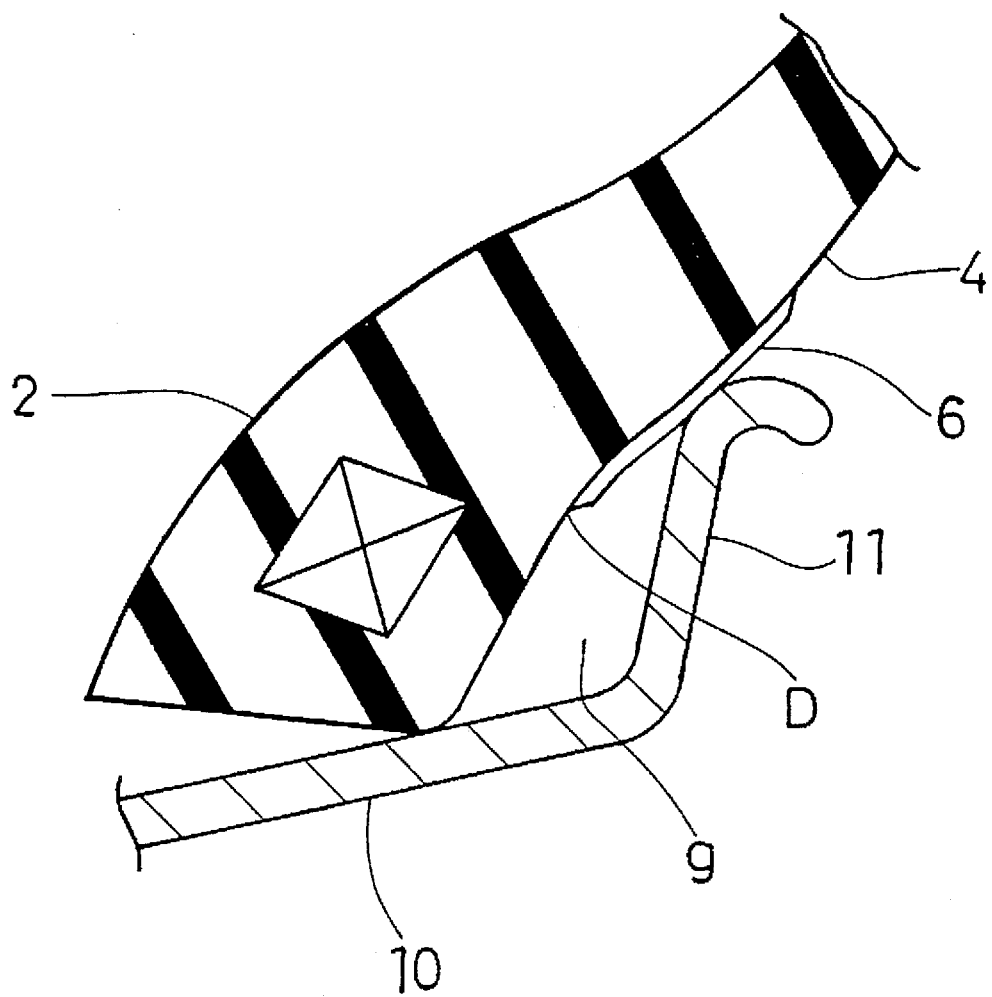
FIG. 5 is a sectional view showing an intermediate action of the rim assembly of FIG. 2.

When starting the rim assembly, as shown in FIG. 5, the bead outside surface 4 is greatly inclined to the rim flange 11. Therefore, even if the inner end D of the exhaust rib 6 is remote from the bead base line by a distance F1 of 0.7 to 1.5 times the flange height FH, the inner end D remains inward in the radial direction by inserting the bead part 2 into the rim 10 with a large inclination. As a result, the air existing in a gap (g) is exhaust outside through the air passages formed by the exhaust ribs 6, and the residual air in the gap (g) after completion of correct assembling is remarkably reduced.

If the distance F1 of the inner end D is less than 0.7 times the flange height FH, it is feared that an inner pressure of the tire would leak because of strong lateral force on the tire such as during cornering. If the distance F1 is over 1.5 times the flange height FH, even upon start of rim assembly, the inner end D hardly communicates with the gap (g). The residual air in the gap (g) after completion of correct assembling is not sufficiently reduced. Also, the exhaust rib 6 having a rectangular sectional shape K is deformed easily by the high internal pressure of the tire so that the rib 6 fits to the rim flange 11 and the air passage is closed by the elastic deformation, thereby enhancing the seal effect and the stability of tire on rim. Especially, when the distance F1 is over the flange height FH, the exhaust ribs 6 are not present between the bead outside surface 4 and rim flange 11 upon completion of rim assembly. Thus, the air tightness is further enhanced and a rim assembly in higher precision is realized.

If the width WA of the rib 6 is less than 0.5 mm or the height HA of the rib 6 is less than 0.5 mm, the exhaust rib 6 is compressively deformed by contact with the rim flange 11 during assembling, and the air passage may be closed. On the other hand, if the width WA is over 1.0 mm or the height HA is over 2.0 mm, the air tightness is spoiled, and an air leak in the tire inner space can no be prevented.

Figure 6:
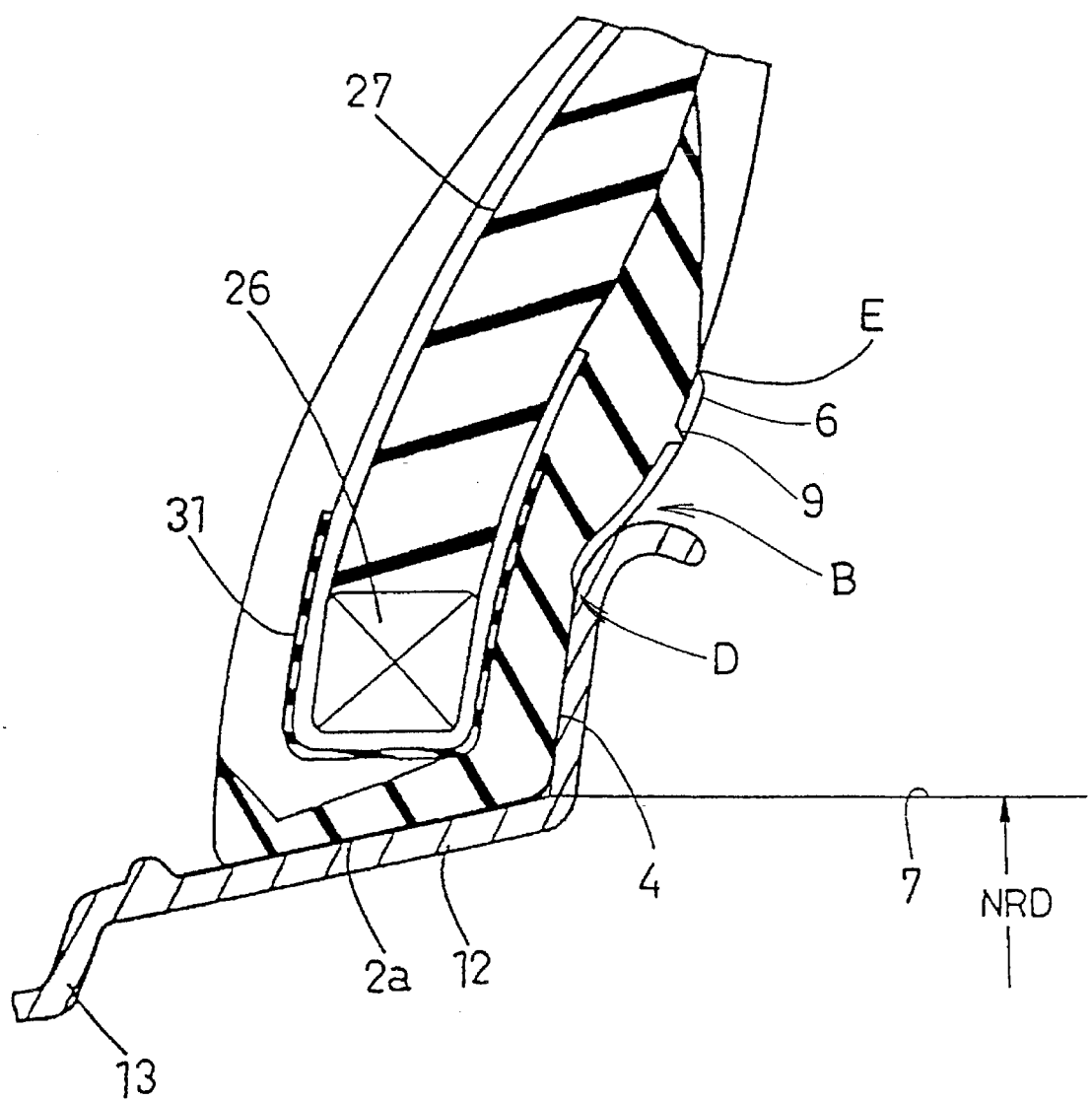
FIG. 6 is a sectional view of a tire bead part showing another example having bypass ribs.
Figure 7:
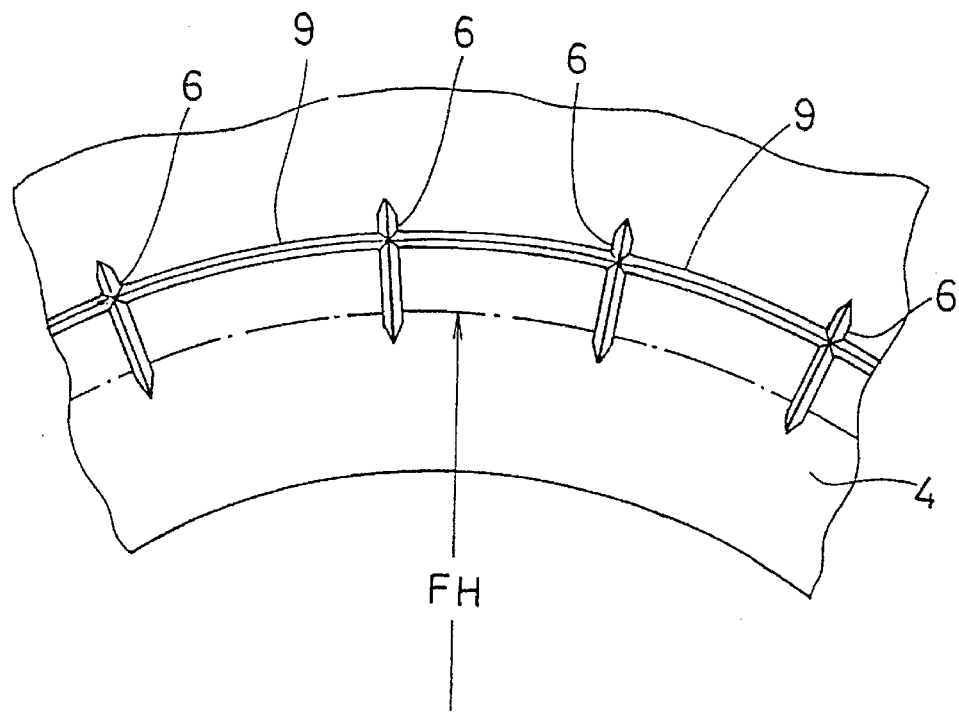
FIG. 7 is a side view showing bypass ribs.
Figure 8:
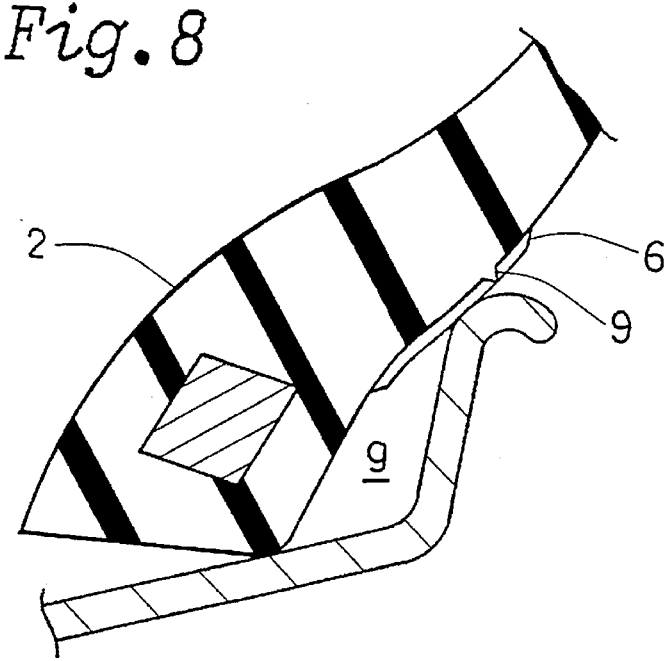
FIG. 8 is a sectional view showing an intermediate action of the rim assembly of FIG. 6.

In the embodiment, furthermore, the bead outside surface 4 can be provided with a plurality of bypass ribs 9 each extending in the tire circumferential direction between the adjacent exhaust ribs 6 so as to communicate the exhaust ribs 6 as shown in FIGS. 6 and 7. The bypass ribs 9 are disposed outside the separating point B in the radial direction and arranged on a concentric circle with the bead base line 7. The bypass ribs 9 enhance the rigidity of the exhaust ribs 6 so that the exhaust ribs 6 are prevented from deformation by contact with the rim flange 11 during rim assembly, thereby maintaining the air passage. As a result, the air in the gap (g) may be uniformly forced out during rim assembly, and the rim assembly precision may be uniform.

The sectional shape of the bypass ribs 9 may be set in various profiles, including trapezoid, square, partially cut circle, and others. But a triangle similar to the exhaust ribs is employed in the embodiment, and the height of the bypass ribs is preferably equal to or less than the height HA of the exhaust ribs 6. The adjacent bypass ribs 9 in the circumferential direction may be different distance from the bead base line 7.

EXAMPLES

Figure 9:
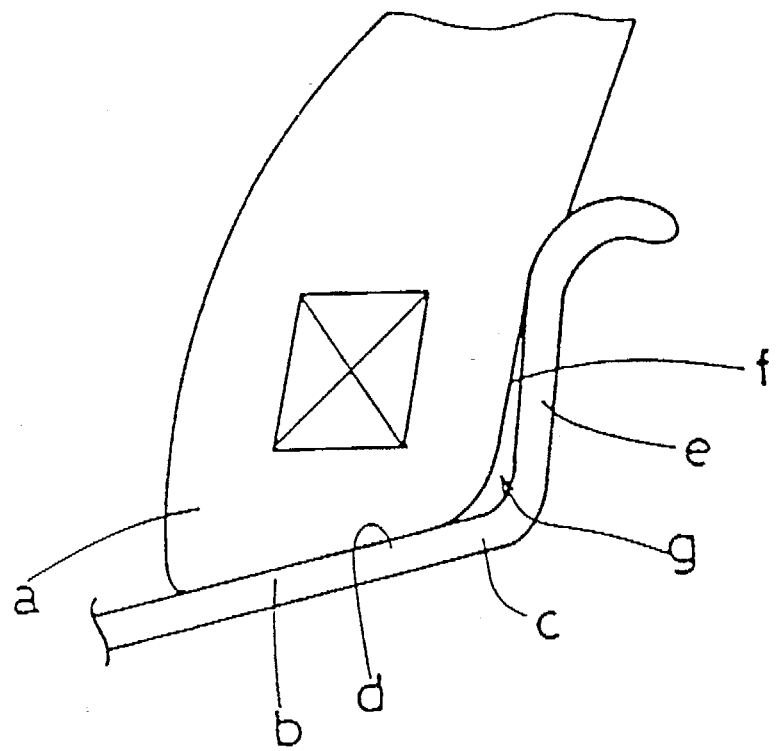
FIG. 9 is a sectional view showing a prior art design.

In the tire size of 225/65R16, the tires (Embodiments 1, 2) in the composition shown in FIGS. 2 and 6 were assembled in a normal rim of 6.55JJ×16, and inflated at internal pressure of 2.0 kg/cm$^2$, and the maximum size of the gap (g) in rim assembly was measured. A conventional tire (Reference) without air exhaust means as shown in FIG. 9 was similarly assembled in a rim, and the gap (g) was measured. The gap size was measured by using a CT scanner. The measurement of the gap is expressed by the mean of measuring four points each on the front and rear side.

To measure the rim deviation, the test tires were installed in a car, and by traveling at a speed of 80 km/h, the brake test of applying brakes of 0.8 G by the gravitational accelerometer for measuring the acceleration in the running direction was repeated 20 times. The total of the rim deviation of tire and rim was measured.

To analyze vibration, the car mounting test tire was driven 100 km, and presence or absence of vibrations was judged by the feeling of the driver.

The results of measurement are shown in Table 1.

As a result of test, as shown in Table 1, in the embodiments, as compared with the reference example, the gap in rim assembly was slight, and the rim deviation was small, and formation of vibrations after specific use was suppressed. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Embodiment 1 | Embodiment 2 | Reference |
| --- | --- | --- | --- |
| Composition of exhaust means | exhaust ribs (FIG. 2) | exhaust ribs + bypass ribs (FIG. 6) | None (FIG. 9) |
| Number of exhaust ribs | 24 | 24 | — |

TABLE 1-continued

|  | Embodiment 1 | Embodiment 2 | Reference |
|---|---|---|---|
| Width WA of the exhaust rib | 0.6 mm | 0.6 mm | — |
| Height HA of the exhaust rib | 0.6 mm | 0.6 mm | — |
| Distance F1 of the exhaust rib | 14 mm (0.78 FH) | 14 mm (0.78 FH) | — |
| Distance F2 of the exhaust rib | 21 mm (1.17 FH) | 21 mm (1.17 FH) | — |
| Gap after rim assembly | 0 mm | 0 mm | 1.2~1.3 mm |
| Rim deviation | 0 mm | 0 mm | 30 mm |
| Vibration | No abnormality after 100 km travel | No abnormality after 100 km travel | No abnormality after 100 km travel |

What is claimed is:

1. A tire and rim combination comprising:

the tire's normal rim, said rim including on each axial side a rim seat and a rim flange extending outwardly in a radial direction from the rim seat, the rim seat extending to a rim protrusion on an axially inner side thereof; and the tire, being a pneumatic tire, comprising a pair of bead parts each having a bead bottom surface seating on the corresponding rim seat and a bead outside surface connecting with the bead bottom surface and abutting against the corresponding rim flange, said bead outside surface being provided with a plurality of pieces of exhaust ribs each projecting from the bead outside surface and extending outwardly in a radial direction from an inner end of the exhaust rib so as to form air passages for escape of air between the rim flange and the bead outside surface during rim assembly, wherein a distance F1 from the inner end of each exhaust rib in each bead part to a bead base line in the radial direction is in a range of 0.7 to 1.5 times a flange height FH measured in the radial direction from the bead base line to a radially outer edge of the rim flange, a distance F2 from an outer end of each exhaust rib in each bead part to the bead base line in the radial direction is not less than 1.1 times the flange height FH, each said exhaust rib has a triangular cross-sectional shape having a width in a tire circumferential direction of 0.5 to 1.0 mm and a height in the tire axial direction of 0.5 to 2.0 mm, and a bead inside surface opposite to the bead outside surface and adjacent the bead bottom surface for each of the bead parts, the tire between the bead inside surface and the bead bottom surface being spaced from and out of engagement with the rim protrusion.

2. The tire and rim combination of claim 1, wherein said inner end of each exhaust rib has an inclination part smoothly reducing the height of the exhaust rib toward the inside in the radial direction.

3. The tire and rim combination of claim 1, wherein each said bead outside surface has bypass ribs extending in a circumferential direction in contact with the exhaust ribs.

4. The tire and rim combination of claim 3, wherein the tire is currently mounted on the rim and said bypass ribs are disposed in each bead part radially outside a separating point at which the beat part separates from the rim flange.

5. The tire and rim combination of claim 4, wherein said bypass ribs are arranged in each bead part on a concentric circle with the bead base line.

6. The tire and rim combination of claim 1, wherein at least eight pieces of exhaust ribs are provided as the plurality of pieces of exhaust ribs.

7. The tire and rim combination of claim 1, wherein the bead outside surface contacts air-tightly with the rim flange from the bead base line to the inner end of each exhaust rib.

* * * * *